UNITED STATES PATENT OFFICE.

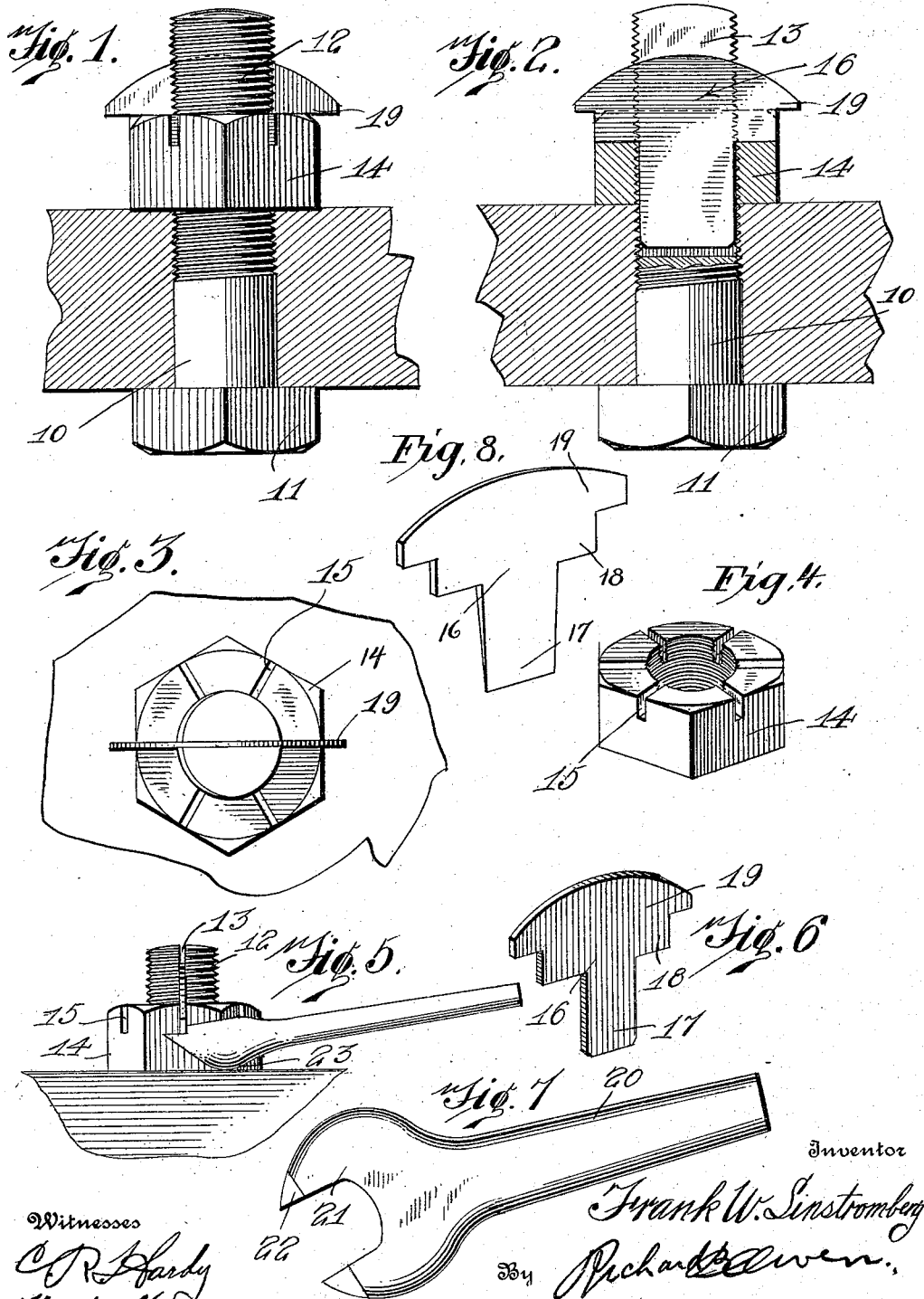

FRANK W. LINSTROMBERG, OF BOURBON, MISSOURI.

NUT-LOCK.

1,185,810.  Specification of Letters Patent.  Patented June 6, 1916.

Application filed May 14, 1915. Serial No. 28,131.

*To all whom it may concern:*

Be it known that I, FRANK W. LINSTROMBERG, citizen of the United States, residing at Bourbon, in the county of Crawford and State of Missouri, have invented certain new and useful Improvements in Nut-Locks, of which the following is a specification.

This invention relates to nut locks and the object of the same is to provide a simple and efficient means for locking the nut upon a bolt, the said means being so constructed as to not in any way mutilate the nut or the bolt, therefore, the lives of the nut and bolt are greatly lengthened.

More specifically this invention provides a bolt having the threaded end thereof slotted and a nut having radial grooves on one face thereof and a locking key, having a portion thereof positioned in said slotted end of the bolt and other portions thereof positioned in certain of the radial grooves of the nut whereby the independent rotation of the nut on the bolt is prevented.

A still further object of this invention is to provide an efficient means for removing the key above set forth from the slotted end of the bolt, thus releasing the nut from its locked position and allowing for the independent rotation on the bolt.

A still further object of this invention is to provide a device that is simple in construction, efficient in operation and consists of a minimum number of parts.

With these and other objects in view, this invention resides in certain novel features of construction, combination and arrangement of parts, as will be hereinafter more fully described and claimed.

In the accompanying drawings: Figure 1 is a view in elevation of the improved nut and bolt, the same being shown in position on a support. Fig. 2 is a view similar to Fig. 1 with a portion of the device shown in section. Fig. 3 is a top plan view of the device as shown in Fig. 1. Fig. 4 is a detail perspective view of the nut used with this device. Fig. 5 is a view in elevation of the nut, a portion of a bolt and a locking means for the nut with an improved wrench used to facilitate the removal of the locking means from the nut. Fig. 6 is a detail perspective view of the locking key used with this device. Fig. 7 is a top plan view of the wrench used for removing the locking key from engagement with the nut, and Fig. 8 is a detail in perspective of a modified form of the locking key.

Referring to the parts by reference numerals, a bolt is designated by the numeral 10 having the ordinary head 11 formed at one end thereof and at the opposite end thereof, the threaded portion 12, the said threaded portion 12 being longitudinally slotted as at 13. A nut 14 of the usual construction, with the exception of the radial grooves 15 formed in one face thereof is adapted to be threaded on the threaded portion 12 of the bolt 10 and to facilitate the locking of the nut 14 on the bolt 10, a locking key 16 is provided, the same having a tang portion 17, locking wings 18 and overhanging shoulders 19. After the nut 14 is positioned on the bolt 10 and is placed in the desired position, it being understood that a pair of the radial grooves 15 are in alinement with the slot 13 in the bolt 10, the locking key 16 is positioned in the slot 13, the tang portion 17 thereof extending into the slot and wings 18 being engaged in the grooves 15 that are alined with the slot 13. As is clearly shown in Figs. 1, 2, and 3, the overhanging shoulders 19 overhang the outer face of the nut 14. If so desired, this key 16 or the tang portion 17 thereof, can be wedge-shaped, and shown to advantage by Fig. 8 so as to efficiently retain the same in connection with the bolt 10 or more specifically in the slot 13 of the same.

When the locking key 16 is positioned as has been heretofore set forth, it is obvious that the independent rotation of the nut 15 upon the bolt 10 is prevented, however, a wrench is provided whereby the key can quickly and efficiently be removed from the position as has been heretofore set forth, the nut 14 being capable of independent rotation on the bolt 10. This wrench as is clearly shown in Fig. 7, comprises a handle 20, and a pair of spaced apart jaws 21, having the ends of the same cut away to form key engaging seats 22. On the opposite faces of the jaws 21 from that of the positioning of the seats 22 are enlargements 23, that form a fulcruming means for the wrench. As is clearly shown in Fig. 5, this wrench is so constructed as to straddle the nut 14 and the seats 22 thereof are placed in engagement with the overhanging shoulders 19 and by means of the fulcruming enlargements 23, the locking key 16 can be moved relative to the nut 14 and the wings 18 of the same disengaged from the grooves 15 and thereby allowing for the independent rotation of the nut upon the bolt.

It will be seen from the foregoing, that an efficient nut lock has been provided that is very simple in construction and requires no springs or other delicate means that are liable to be affected by the weather and, furthermore, after the nut has been once locked on the bolt, the same can be quickly and efficiently removed therefrom and both the nut and bolt will be capable of further use.

It is obvious that minor changes may be made in the form and construction of this device without departing from the material parts thereof. It is therefore not wished to confine the invention to the exact form herein shown and described, but it is wished to include all such as properly come within the scope claimed.

What is claimed is:—

1. In combination with a bolt having a slotted end, of a nut threaded on said bolt having a plurality of radial grooves formed therein, of a locking key having a tang portion, a pair of locking means and overhanging shoulders, said tang positioned in said slotted end of said bolt, said locking means positioned in certain of said grooves in said nut and the said overhanging shoulders extending beyond the outer end of said nut whereby the same can be engaged by the implement to remove the locking key from engagement with said nut.

2. In combination with a bolt having a slotted end, of a nut threaded on said bolt having a plurality of radial grooves formed therein, of a locking key; said locking key having a tang portion positioned in the slotted end of said bolt, offset shoulder portions arranged at one end of the tang for positioning in certain of said grooves in said nut whereby said nut is prevented from independently rotating on said bolt, and second offset shoulder portions formed upon the first mentioned shoulder portions for engagement with an implement to remove the locking key.

3. In combination with a bolt having a slotted end, of a nut threaded on said bolt having a plurality of radial grooves formed therein, of a locking key, said locking key having an elongated tang portion positioned in the slotted end of said bolt, right angular extensions formed adjacent one end of said tang for positioning in certain of said grooves in said nut whereby said nut is prevented from independently rotating on said bolt, and reduced right angular extensions formed upon the first mentioned extensions and extending beyond the outer end of said nut whereby the same may be engaged by an implement to remove the locking key from engagement with said nut.

In testimony whereof I affix my signature in presence of two witnesses.

FRANK W. LINSTROMBERG.

Witnesses:
J. H. ESSMAN,
LOUIS W. KAPPELMANN.

Copies of this patent may be obtained for five cents each, by addressing the "Commissioner of Patents, Washington, D. C."